United States Patent
Boutaghou et al.

(10) Patent No.: US 6,172,852 B1
(45) Date of Patent: Jan. 9, 2001

(54) ACTUATOR ASSEMBLY FOR A DISC DRIVE HAVING STACKED ACTUATOR ARMS WITH INTERLOCKED ASPERITIES ON MATING SURFACES

(75) Inventors: Zine-Eddine Boutaghou, Vadnais Heights; Gene Patrick Bonnie, Eden Prairie, both of MN (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/170,030

(22) Filed: Oct. 13, 1998

Related U.S. Application Data

(60) Provisional application No. 60/074,777, filed on Feb. 17, 1998.

(51) Int. Cl.[7] ............................................. G11B 5/48
(52) U.S. Cl. ........................... 360/244.5; 360/244.7; 360/266.1
(58) Field of Search .................................. 360/104, 106, 360/244.5, 244.7, 266.1

(56) References Cited

U.S. PATENT DOCUMENTS

| | | |
|---|---|---|
| 4,829,395 | 5/1989 | Coon et al. . |
| 4,912,583 | 3/1990 | Hinlein . |
| 5,172,286 | 12/1992 | Jurgenson . |
| 5,184,265 | 2/1993 | Foote et al. . |
| 5,596,462 * | 1/1997 | Smith ................................ 360/99.12 |
| 5,689,389 | 11/1997 | Braunheim . |
| 5,711,063 | 1/1998 | Budde et al. . |
| 5,759,418 * | 6/1998 | Frater ................................... 360/104 |
| 5,946,164 * | 8/1999 | Tracy .................................... 360/104 |

* cited by examiner

Primary Examiner—A. J. Heinz
(74) Attorney, Agent, or Firm—Merchant & Gould P.C.

(57) ABSTRACT

An actuator assembly for suspending and positioning at least one read/write head over at least one substantially flat surface of magnetic media is disclosed. The actuator assembly is comprised of at least one HSA and at least one actuator arm. Each actuator arm has an actuator arm distal end mating surface for coupling to at least one HSA and actuator arm upper and lower bearing mating surfaces for coupling to other actuator arms. Each HSA has an HSA proximal end mating surface for coupling to an actuator arm and an HSA distal end mating surface for coupling to a read/write head. At least one of the actuator arm distal end mating surfaces, HSA proximal end mating surfaces, actuator arm upper bearing mating surfaces, and actuator arm lower bearing mating surfaces is roughened to increase frictional coupling such that component alignment is not disturbed if the disk drive system is subjected to a mechanical shock. In addition, adhesive may be employed between the mating surfaces to increase coupling strength.

18 Claims, 6 Drawing Sheets

ACTUATOR ASSEMBLY FOR A DISC DRIVE HAVING STACKED ACTUATOR ARMS WITH INTERLOCKED ASPERITIES ON MATING SURFACES

CROSS-REFERENCE TO RELATED APPLICATIONS

Embodiments of this invention relate to Provisional Application Ser. No. 60/074,777, filed Feb. 17, 1998. The contents of that application are incorporated by reference herein.

BACKGROUND OF THE INVENTION

1. Field of the Invention

Embodiments of this invention relate generally to actuator arms and head suspension assemblies (HSAs) for suspending and positioning read/write heads over magnetic media of the type generally used for storing digital data, and in particular embodiments to apparatus for preventing slippage of multiple stacked actuator arms and HSAs with respect to each other when mechanical shock is encountered, and systems incorporating the same.

2. Description of Related Art

Modem computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. To access memory locations on a hard disk, a read/write head is positioned slightly above the surface of the hard disk while the hard disk rotates beneath the read/write head at an essentially constant velocity. By moving the read/write head radially over the rotating hard disk, all memory locations on the hard disk can be accessed. The read/write head is typically referred to as "flying" head because it is coupled to a slider aerodynamically configured to hover above the surface on an air bearing located between the hard disk and the slider that forms as the hard disk rotates at high speeds.

In conventional disk drives, multiple hard disks are coupled to and rotate about a spindle, each hard disk presenting two substantially flat surfaces for reading and recording. Typically, these rotating hard disks are stacked in a parallel relationship within minimal spacing between them. Accordingly, the read/write heads must be designed to move within the narrow space between adjacent hard disks and fly close to the hard disk surfaces. To achieve this positional capability, the read/write heads in typical disk drives are coupled to the distal end of thin, arm-like structures called head suspension assemblies (HSAs), which are inserted within the narrow space between adjacent hard disks. These HSAs are made of materials and thicknesses as to be somewhat flexible and allow a measure of vertical positioning as the read/write head hovers over the surface of the rotating hard disk.

Each HSA is coupled at its proximal end to a rigid actuator arm that horizontally positions the HSA and read/write head over the hard disk surface. In conventional disk drives, all actuator arms are machined from a single piece of material, forming an multi-arm actuator assembly which moves as a unit under the influence of a voice coil motor to simultaneously position all HSAs and corresponding read/write heads over the hard disk surfaces.

As disk drives have become physically smaller in size with increased data storage capacity, hard disk data recording densities have increased dramatically and data tracks have become smaller and have been positioned increasingly closer together. Read/write heads and sliders have also seen a corresponding decrease in size. This decrease in size has made disk drive assemblies more sensitive and susceptible to manufacturing tolerances and assembly variations. However, manufacturers have found that these manufacturing tolerances and assembly variations can be minimized or mitigated by assembling and testing at sub-assembly levels rather than assembling and testing a disk drive in its entirety. In addition, because the smaller geometries of today's disk drives require costly, precision-made parts manufactured to exacting standards, manufacturers have found that the ability to couple and decouple sub-assemblies can substantially reduce costs should a part need rework or become irreparably damaged and require replacement.

Thus, it is presently desirable to manufacture individual actuator arms rather than a plurality of actuator arms machined from a single piece of material, and assemble and test a sub-assembly comprised of an actuator arm, HSA, and read/write head. Once testing of the sub-assembly is complete, the actuator arms can then be coupled together as a completed actuator assembly.

However, sub-assemblies can also increase the possibility of positional errors by introducing additional interfaces requiring accurate alignment. For example, if actuator arms are separately formed, they must eventually be coupled together by a bolt or bearing cartridge to form an actuator assembly. If the actuator assembly should encounter high physical shocks arising from non-operational conditions such as the dropping or bumping of the disk drive, the coupled actuator arms may slip with respect to each other. In addition, operational conditions such as crash stops may induce similar slippage of the coupled actuator arms. A crash stop occurs when the disk drive loses servo and the read/write heads are abruptly moved to the landing zone to avoid having the heads touch down onto data areas of the hard disk. As the read/write heads are "parked," the actuator arms encounter a crash stop pin designed to prevent the HSA from contacting the spindle. The abrupt stoppage of the actuator assembly against the crash stop pin may cause slippage of the coupled actuator arms. Such slippage is likely to cause data errors in present-day small geometry and positional error-intolerant disk drives.

The interface between the actuator arms and the HSAs is another area of possible slippage caused by the mechanical shocks discussed above. Such slippage is equally likely to cause data errors in present-day disk drives. One proposal for fastening actuator arms to HSAs is disclosed in U.S. Pat. No. 4,912,583 to Hinlein, incorporated herein by reference. The patent discloses a threaded clamp having a thin nut plate formed with a threaded boss and a screw for threadable engagement with the boss. The boss is formed to telescopically engage respective openings formed in the actuator arm and HSA, with the screw confining the components therebetween. The actuator arm and HSA are then clamped in vertical relationship such that the HSA and actuator arm act as a single unit. Because of the multiple plate and screw arrangement, the overall vertical profile is relatively high. Furthermore, because of the compressive force needed to keep the HSA and actuator arm in proper alignment, the geometry of the threaded clamp cannot be made arbitrarily small. The high vertical profile of the threaded clamp solution may therefore have trouble fitting into the low profile disk drives of today.

An alternative to the solution proposed above is disclosed in U.S. Pat. No. 4,829,395 to Coon, and allegedly improved upon in U.S. Pat. No. 5,172,286 to Jurgenson, both incorporated herein by reference. These patents teach a fastener for connecting the actuator arm to the HSA through use of a swaging process. The fastener, or swage mount, comprises a thin base plate formed on one side with an opening and formed on the other side with an outwardly projecting cylindrical boss of a predetermined height and radius corresponding to the opening formed in the HSA. The boss includes an inner engagement surface axially aligned with the base plate opening for receiving staking during the swaging process. Fastening is accomplished by first welding the swage mount base plate to the actuator arm, then positioning the HSA opening telescopically over the swage mount boss. An oversized swaging element is then staked through the openings to radially expand the swage mount boss to connect the components through an interference fit. The primary advantage of the swage mount fastener is the omission of the screw, which undesirably increases the vertical profile of the actuator arm to load beam joint. Disconnection of the components is easily accomplished by simply breaking the bond through application of a force exceeding the torque retention of the swage mount.

The asserted improvement in Jurgenson further expands on the principles of the swage mount disclosed by Coon by constructing two low profile swage mounts having complementarily formed hubs that, when swaged together, are said to provide sufficient torque retention to fasten the HSA to the actuator arm.

While the conventional swage mount configurations disclosed in Coon and Jurgenson allow a substantial reduction in overall vertical profile for the actuator arm/HSA connection, such swage mounts are subject to minimum profile limits in order to maintain sufficient torque retention and avoid slippage, which is primarily dependent upon hub height and hub radial thickness. Again, the high vertical profile of these solutions may be problematic in the low profile disk drives of today.

SUMMARY OF THE DISCLOSURE

Therefore, it is an object of embodiments of the invention to provide a system and apparatus for enhancing conventional techniques for coupling actuator arms and HSAs in a disk drive to avoid slippage of the actuator arms and HSAs with respect to each other and reduce resultant data errors.

It is a further object of embodiments of the invention to provide a system and apparatus for coupling actuator arms and HSAs in a disk drive to avoid slippage of the actuator arms and HSAs with respect to each other and reduce resultant data errors, thereby allowing a relaxation of the size and strength of conventional coupling hardware and techniques and the minimizing of disk drive heights.

These and other objects are accomplished according to an actuator assembly for suspending and positioning at least one read/write head over at least one substantially flat surface of magnetic media. The actuator assembly is comprised of at least one HSA and at least one actuator arm. Each actuator arm has an actuator arm distal end mating surface for coupling to at least one HSA, and actuator arm upper and lower bearing mating surfaces for coupling to other actuator arms. Each HSA has an HSA proximal end mating surface for coupling to an actuator arm and an HSA distal end mating surface for coupling to a read/write head. At least one of the actuator arm distal end mating surfaces, HSA proximal end mating surfaces, actuator arm upper bearing mating surfaces, and actuator arm lower bearing mating surfaces is roughened to increase frictional coupling such that component alignment is not disturbed if the disk drive system is subjected to a mechanical shock. In addition, adhesive may be employed between the mating surfaces to increase coupling strength.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

In conventional disk drives, multiple hard disks are coupled to and rotate about a spindle, each hard disk presenting two substantially flat surfaces for reading and recording. Typically, these rotating hard disks are stacked in a parallel relationship within minimal spacing between them. Accordingly, the read/write heads must be designed to move within the narrow space between adjacent hard disks and fly close to the hard disk surfaces. To achieve this positional capability, the read/write heads in typical disk drives are coupled to the distal end of thin, arm-like structures called head suspension assemblies (HSAs), which are inserted within the narrow space between adjacent hard disks. These HSAs are made of materials and thicknesses as to be somewhat flexible and allow a measure of vertical positioning as the read/write head flies over the surface of the rotating hard disk.

Each HSA is coupled to a rigid actuator arm for positioning the HSA and read/write head horizontally over the hard disk surface. All actuator arms move as a unit under the influence of a voice coil motor to simultaneously position all HSAs and corresponding read/write heads over the hard disk surface.

As disk drives have become smaller in size with increased data storage capacity, hard disk data recording densities have increased dramatically and data tracks have become smaller and have been positioned increasingly closer together. Read/write heads and sliders have also seen a corresponding decrease in size. This decrease in size has made disk drive assemblies more susceptible to problems due to manufacturing tolerances and assembly variations. However, manufacturers have found that these manufacturing tolerances and assembly variations can be minimized or mitigated by assembling and testing at sub-assembly levels prior to assembling a unit in its entirety.

Thus, it is presently desirable to machine individual actuator arms, and assemble and test a sub-assembly comprised of an actuator arm, HSA, and read/write head. Once the sub-assembly is assembled and tested, the actuator arms can then be coupled together to form a completed actuator assembly. In addition, because each component of the actuator assembly includes costly, precision-made parts manufactured to exacting standards, manufacturers have found that the ability to couple and decouple individual sub-assemblies can substantially reduce costs should a part need rework or become irreparably damaged and require replacement.

Figure 1:
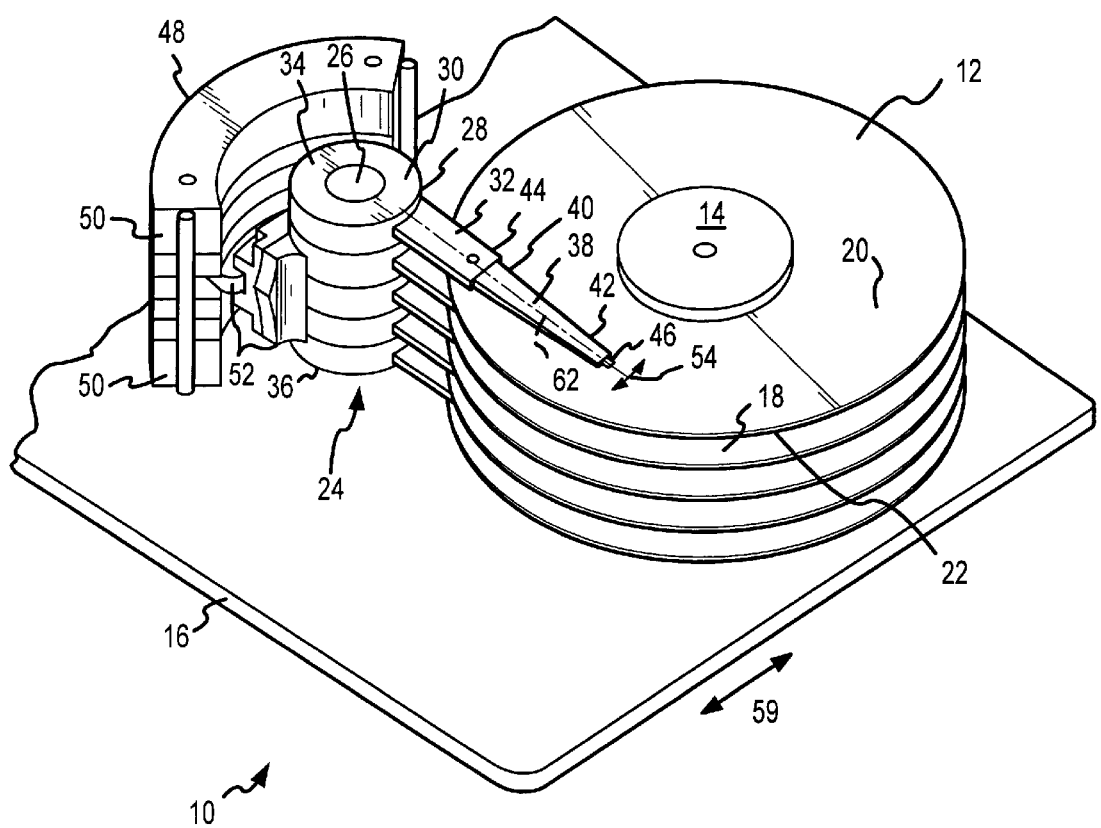
FIG. 1 is a perspective view of a disk drive system according to an embodiment of the invention.

FIG. 1 illustrates a disk drive system 10 according to an embodiment of the present invention. A plurality of hard disks 12 are coupled to a spindle 14 which is rotatably mounted to chassis 16 and powered by a spindle motor (not shown in FIG. 1). The plurality of hard disks 12 are stacked in a parallel orientation with a gap 18 between adjacent hard disks such that the top surface 20 and bottom surface 22 of each hard disk 12 is accessible. Although FIG. 1 shows a five-disk stack, in alternate embodiments of the present invention any number of hard disks, including a single hard disk, may be utilized.

Adjacent to the stack of hard disks 12 is an actuator assembly 24 rotatably mounted to the chassis 16 about bearing cartridge 26. The actuator assembly 24 comprises a plurality of actuator arms 28, each actuator arm comprising a bearing portion 30 and an arm portion 32. The bearing portion 30 further includes an upper bearing mating surface 34 and a lower bearing mating surface 36. The actuator arms 28 are vertically stacked about the bearing cartridge 30 such that the upper bearing mating surfaces 34 and lower bearing mating surfaces 36 of adjacent actuator arms 28 come into contact with each other. In preferred embodiments of the present invention, when the actuator arms 28 are properly mounted about the bearing cartridge 26, the bearing cartridge 26 retains the actuator arms 28 by applying compressive force perpendicular to the upper and lower bearing mating surfaces 34 and 36, and maintains the actuator arms 28 such that the arm portions 32 of each actuator arm 28 are substantially vertically aligned over each other. In alternate embodiments of the present invention, retaining means other than a bearing cartridge 26 may be used such as bolts, threaded cylindrical connectors, or swaged or interference fit connectors.

The actuator assembly 24 further comprises a plurality of HSAs 38, at least one HSA for every actuator arm 28. Each HSA 38 includes an HSA proximal end 40 and an HSA distal end 42. An arm portion distal end 44 of the actuator arm 28 receivably retains the HSA proximal end 40 of corresponding HSAs 38. A read/write head 46 is coupled to the HSA distal end 42. The actuator assembly 24 is mounted in relation to the hard disks 12 such that the actuator arms 28 and corresponding HSAs 38 are positioned within the gap 18 between adjacent hard disks 12 and the read/write heads 46 are positioned in close proximity to the upper and lower surfaces 20 and 22 of the hard disks 12.

Preferred embodiments of the disk drive system 10 also include a voice coil motor 48 for positioning the actuator assembly 24. The voice coil motor 48 comprises a magnetic stator 50 fixedly coupled to chassis 16 and a rotor 52, fixedly coupled to the actuator assembly 24. The rotor 52 includes a coil (not shown in FIG. 1) such that when current flows through the coil, electromagnetic forces cause the rotor 52 and fixedly attached actuator assembly 24 to rotate about the bearing cartridge 26. This rotation causes the read/write heads 46 to move radially with respect to the hard disks 12 as indicated by arrow 54. In alternate embodiments of the present invention, the coil may be fixedly attached to the housing 16 and the stator may contain magnetized material. In further alternate embodiments of the present invention, a stepper motor or other positioning system may be used in place of the voice coil motor 48. In addition, although FIG. 1 illustrates a rotatable actuator assembly 24, in alternate embodiments of the present invention the actuator assembly 24 may be linearly displaced to produce radial movement of the read/write heads 46 with respect to the hard disks 12.

In operation, the spindle motor (not shown in FIG. 1) causes spindle 14 and fixedly coupled hard disks 12 to rotate at an essentially constant velocity. Under program control, the coil (not shown in FIG. 1) on the rotor 52 is energized, causing movement of the rotor 52 with respect to the stator 50. Movement of the rotor 52 causes the fixedly coupled actuator assembly 24 to rotate about bearing cartridge 26, which also causes the read/write head 46 to move radially with respect to the hard disks 12 as indicated by arrow 54. With 360 degree rotatable hard disks 12 moving beneath radially positionable read/write heads 46, all data areas on each hard disk 12 may be accessed.

Figure 2:
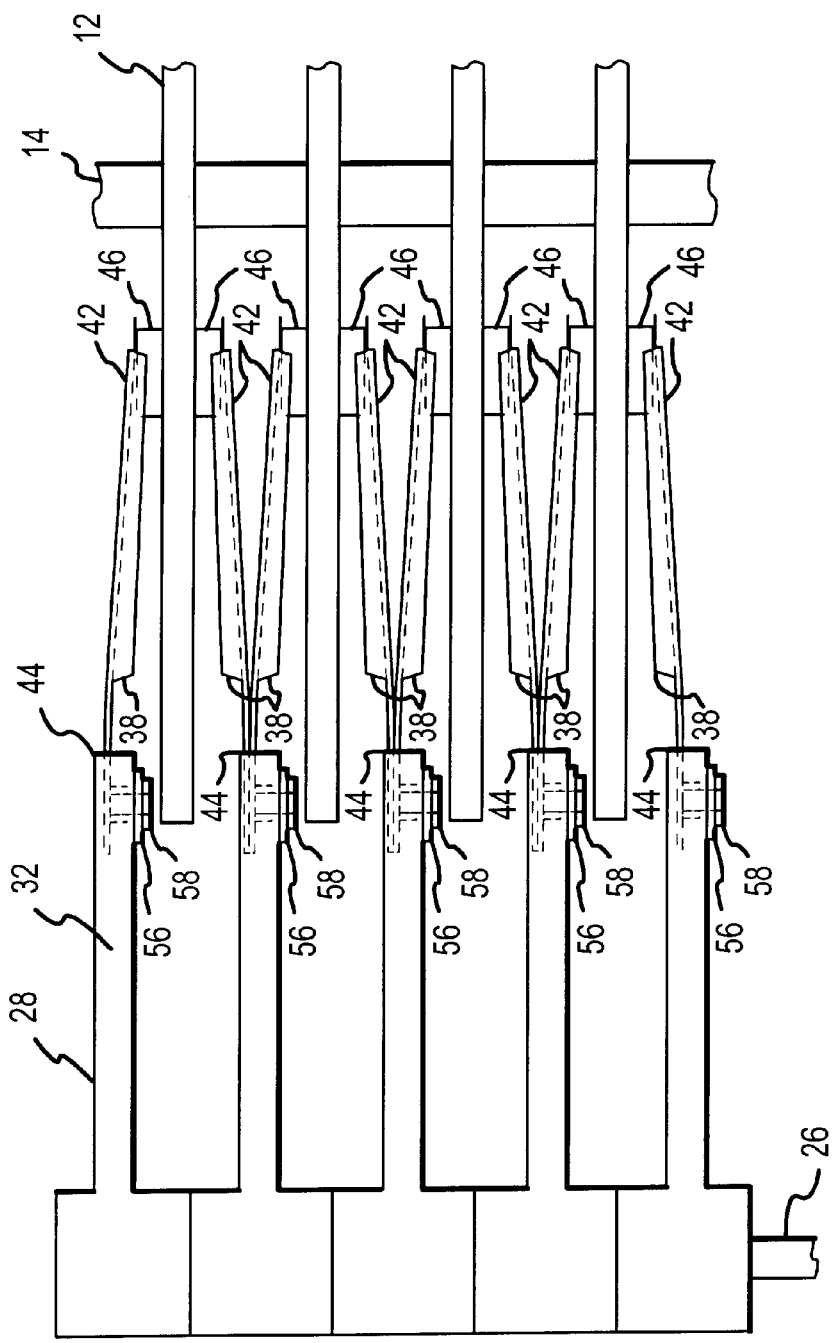
FIG. 2 is a side view of an actuator assembly according to an embodiment of the invention.

FIG. 2 is a side view of an actuator assembly according to an embodiment of the present invention. In one embodiment of the present invention, the arm portion distal end 44 of actuator arms 28 may receivably retain corresponding HSAs 38 through the use of washers 56 and bolts 58 or other retaining hardware. In alternate embodiments of the present invention, threaded or swaged bosses may also be used. Note that in the embodiment of FIG. 2, actuator arms 28 inserted within the gaps 18 between hard disks 12 are coupled to two HSAs 38 for accessing both exposed surfaces of the hard disks 12, while acutator arms 28 positioned outside the disk drive stack are coupled to only one HSA 38. However, in alternate embodiments of the present invention, two actuator arms 28 may be inserted within the gaps 18 between hard disks 12, each actuator arm 28 being coupled to a single HSA 38.

Referring again to FIG. 1, vertical and horizontal alignment of the read/write heads 46 is critical to properly accessing data on the hard disks 12. Misalignment can lead to data errors. Thus, the alignment of each HSA 38 with respect to its corresponding actuator arm 28 must be maintained (for example, along longitudinal axis 62 in FIG. 1), in addition to the alignment of the actuator arms 28 stacked about the bearing cartridge 26. Slippage of the HSAs 38 or actuator arms 28 may occur if the disk drive system 10 receives a mechanical shock, especially one causing displacement in the direction indicated by arrow 59, or generally in a direction perpendicular to the longitudinal axis 62 of the actuator arms 28 or HSAs 38. However, by roughening the surfaces of actuator arms 28, HSAs 38, washers 56, bolts 58, or other securement devices that come into mating contact with each other, this slippage may be minimized.

Figure 3A:
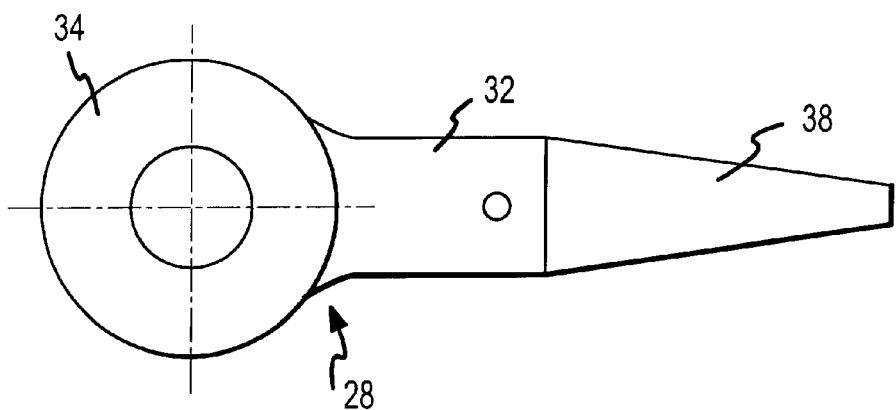
FIG. 3a is a top view of an actuator arm coupled to an HSA according to an embodiment of the invention.
Figure 3B:
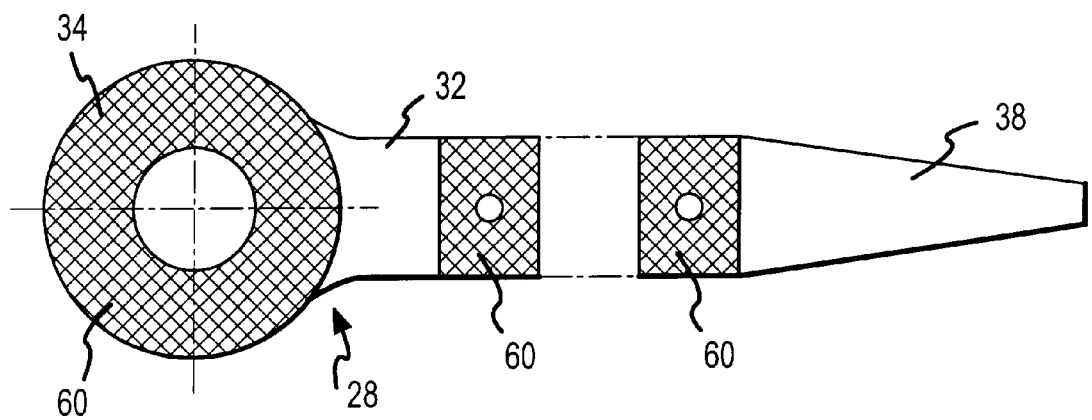
FIG. 3b is a top view of an actuator arm decoupled from an HSA and showing roughened surfaces according to an embodiment of the invention.
Figure 4:
FIG. 4 is a symbolic representation of the interlocking of asperities on coupling surfaces according to an embodiment of the invention.

FIG. 3a is a top view of an actuator arm 28 coupled to an HSA 38, and FIG. 3b is a top view of the actuator arm 28 decoupled from the HSA 38, further showing roughened mating surfaces 60 on the actuator arm 28 and HSA 38. Note that in FIG. 3b, lower bearing mating surface 36 is not shown, although it may also be roughened. In alternate embodiments of the present invention, not all mating surfaces may be roughened, and those surfaces that are roughened may only have roughening on selected areas. By increasing the mechanical roughness of the mating surfaces as illustrated symbolically in FIG. 4, physical locking of the asperities thereon will create higher torque retention capabilities. The compressive force 62 (see FIG. 5) required to cause interlocking depends on the roughness and properties of the surface as described by J. A. Greenwood and J. B. P. Williamson in Contact of Nominally Flat Surfaces, Proceedings of the Royal Society, 1966, incorporated herein by reference. Generally, the rougher the mating surfaces, the less compressive force is needed to prevent slippage.

The roughening of a mating surface can be achieved by several processes. Mechanical texturing can be achieved by grinding the surfaces. For multi-phase material comprised of component materials etchable at different rates such as the chromium and iron in stainless steel, chemical or electro-etching can be used to preferentially etch one of the phases present in a metallic structure to form surface pits. In alternate embodiments of the invention, this process can also be used on ceramic structures to etch out one of the phases. Photolithographic or mesh etching may also be employed Coining, a process of forming material by squeezing it between two dies so as to impress well-defined imprints on the material, can also be used to form pits or bumps. In preferred embodiments of the present invention, laser texturing is used to produce repeatable and controllable patterns of bumps or pits on the mating surfaces.

Figure 5:
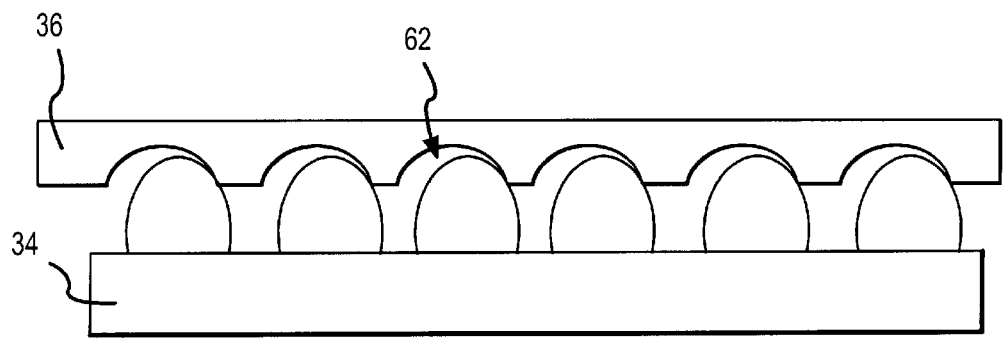
FIG. 5 is a side view showing bumps and pits on coupling surfaces according to an embodiment of the invention.
Figure 6:
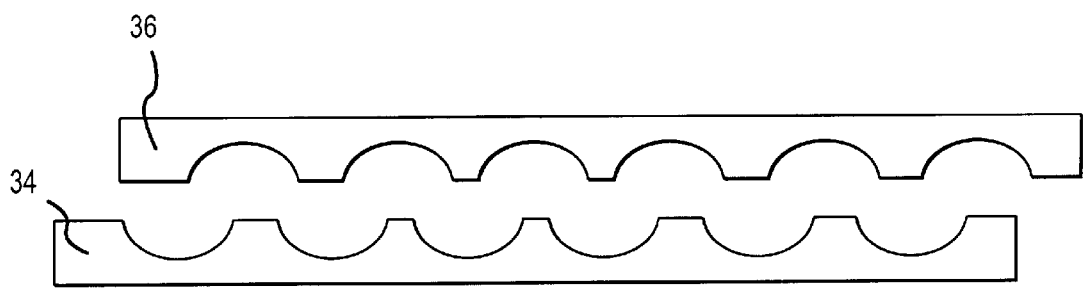
FIG. 6 is a side view showing pits and indentations on coupling surfaces according to an embodiment of the invention.
Figure 7:
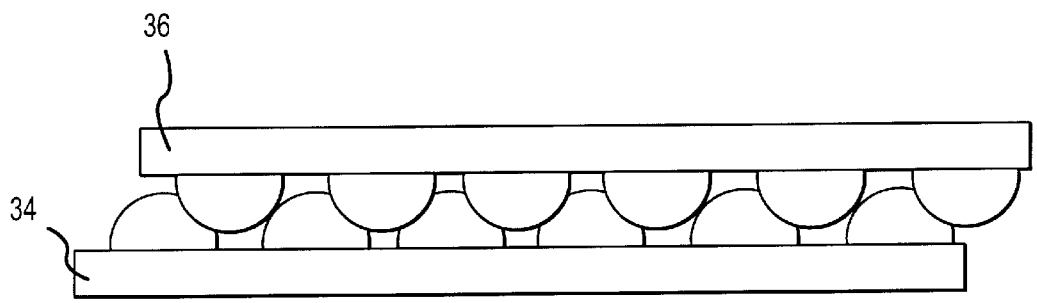
FIG. 7 is a side view showing mating bumps or protrusions on coupling surfaces according to an embodiment of the invention.
Figure 8:
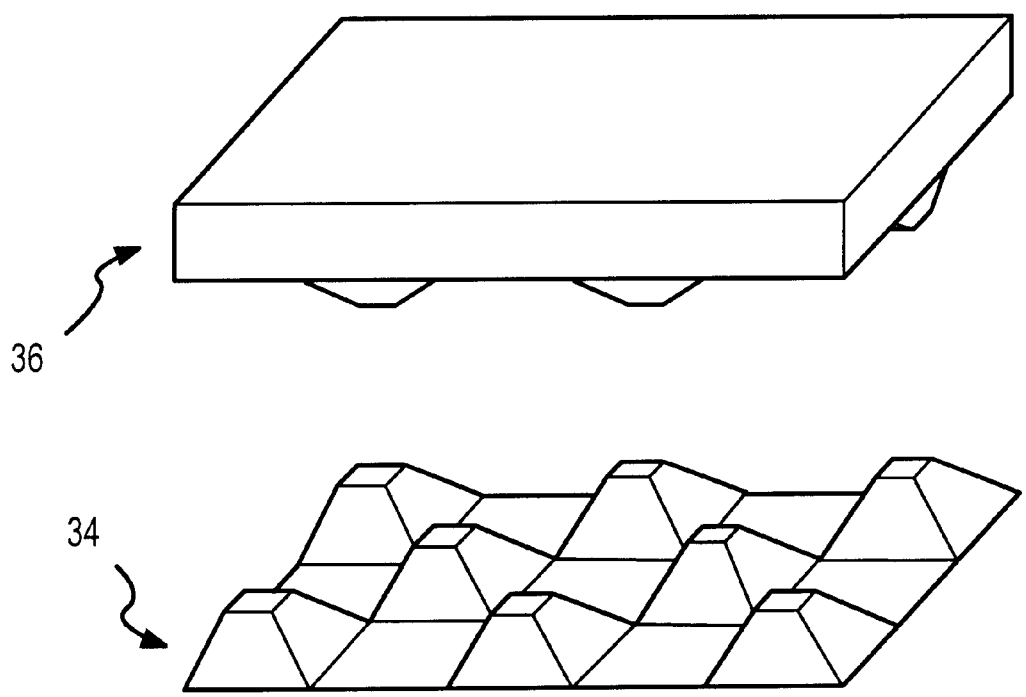
FIG. 8 is a side view showing micro-pyramids on coupling surfaces according to an embodiment of the invention.

The physical locking of asperities on the contacting surfaces may be produced by bumps compressed against pits, as illustrated in FIG. 5, pits compressed against pits, as illustrated in FIG. 6, bumps compressed against bumps, as illustrated in FIG. 7, interlocking micro-pyramids, as illustrated in FIG. 8, or more generally, any combination of engagable protrusions. In preferred embodiments of the present invention, pits and bumps of corresponding sizes may be used on adjacent contacting surfaces to enhance the interlocking of the asperities.

In embodiments of the present invention, the interlocking of asperities may be further enhanced by the use of an adhesive located between the contacting surfaces. In preferred embodiments of the present invention, in addition to the roughening of mating surfaces described above, an adhesive with high bonding strength in the lateral direction (roughly parallel to the plane of the mating surfaces) but limited bonding strength in the vertical or separating direction (roughly perpendicular to the plane of the mating surfaces) is applied to either or both of the mating surfaces. High bonding strength in the lateral direction but limited bonding strength in the separating direction minimizes slippage of the mating surfaces, yet allows for easier decoupling of the surfaces should disassembly be required. In alternate embodiments of the present invention, adhesive may be used on mating surfaces that have not been roughened.

Therefore, according to the foregoing description, preferred embodiments of the present invention provide a system and apparatus for enhancing conventional techniques for coupling actuator arms and HSAs in a disk drive to avoid slippage of the actuator arms and HSAs with respect to each other and reduce resultant data errors. In addition, embodiments of the invention provide a system and apparatus for coupling actuator arms and HSAs in a disk drive to avoid slippage of the actuator arms and HSAs with respect to each other and reduce resultant data errors, thereby allowing a relaxation in the compressive force, size, and strength of conventional coupling techniques and hardware and the minimizing of disk drive heights. The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. An actuator assembly for suspending and positioning a read/write head over a substantially flat surface of magnetic media, the actuator assembly comprising:

an actuator arm having a distal end mating surface that includes asperities intentionally formed on the mating surface;

a head suspension assembly (HSA) having a distal end for supporting the read/write head and a proximal end mating surface that includes asperities intentionally formed on the mating surface; and means for assembling the HSA to the actuator arm so that the asperities on the proximal end mating surface of the HSA engage the asperities on the distal end mating surface of the actuator arm to increase frictional coupling between the mating surfaces and reduce relative motion of the two mating surfaces when the actuator assembly is subjected to a mechanical shock.

2. The actuator assembly of claim 1 wherein:

the asperities on the mating surface of one of the actuator arm and the HSA are formed as protrusions; and the asperities on the mating surface of the other of the actuator arm and the HSA are formed as depressions so that assembly of the HSA to the actuator arm causes a plurality of depressions formed on one mating surface to receive a plurality of protrusions formed on the other mating surface.

3. The actuator assembly of claim 1 wherein:

the asperities on the mating surfaces of the actuator arm and the HSA are formed as protrusions so that assembly of the HSA to the actuator arm causes a plurality of protrusions formed on the proximal end mating surface of the HSA to engage a plurality of protrusions formed on the distal end mating surface of the actuator arm.

4. The actuator assembly of claim 1 wherein:

the asperities on the mating surfaces of the actuator arm and the HSA are formed as depressions so that assembly of the HSA to the actuator arm causes a plurality of depressions formed on the proximal end mating surface of the HSA to engage a plurality of depressions formed on the distal end mating surface of the actuator arm.

5. The actuator assembly of claim 1 wherein:

the asperities on the mating surfaces of the actuator arm and the HSA are formed as micro-pyramids so that assembly of the HSA to the actuator arm causes a plurality of micro-pyramids formed on the proximal end mating surface of the HSA to engage a plurality of micro-pyramids formed on the distal end mating surface of the actuator arm.

6. The actuator assembly of claim 1 wherein:

the means for assembling the HSA to the actuator arm includes a threaded fastener and a washer having a bearing surface for contacting one of the HSA and the actuator arm, the washer bearing surface including intentionally formed asperities to increase frictional coupling and reduce relative motion between the washer bearing surface and the one of the HSA and the actuator arm when the actuator assembly is subjected to a mechanical shock.

7. The actuator assembly of claim 1, wherein the asperities on the distal end mating surface of the actuator arm and the proximal end mating surface of the HSA are formed by a process selected from the group consisting of coining, mechanical grinding, machining, chemical etching, and laser etching.

8. The actuator assembly of claim 1 further comprising:

adhesive placed between the distal end mating surface of the actuator arm and the proximal end mating surface of the HSA to further reduce relative motion of the two mating surfaces when the actuator assembly is subjected to a mechanical shock.

9. The actuator assembly of claim 1 wherein:

the actuator assembly comprises a plurality of actuator arms assembled together; and each actuator arm defines upper and lower bearing surfaces including asperities intentionally formed on each of the bearing surfaces, the asperities of the lower bearing surface of a first actuator arm engaging the asperities of the upper bearing surface of a second actuator arm to increase frictional coupling between the bearing surfaces and reduce relative motion of the two bearing surfaces when the actuator assembly is subjected to a mechanical shock.

10. An actuator assembly for suspending and positioning a read/write head over a substantially flat surface of magnetic media, the actuator assembly comprising:

a plurality of actuator arms, each actuator arm defining upper and lower bearing surfaces including asperities intentionally formed on each of the bearing surfaces; and means for assembling the plurality of actuator arms so that the asperities of the lower bearing surface of a first actuator and engage the asperities of the upper bearing surface of a second actuator arm to increase frictional coupling between the bearing surfaces and reduce relative motion of the two bearing surfaces when the actuator assembly is subjected to a mechanical shock.

11. The actuator assembly of claim 10 wherein:

the asperities on one of the upper and lower bearing surfaces of each actuator arm are formed as protrusions; and the asperities on the other of the upper and lower bearing surfaces of each actuator arm are formed as depressions so that assembly of two actuator arms causes a plurality of depressions formed on one of the upper and lower bearing surface of a first actuator arm to receive a plurality of protrusions formed on the other of the upper and lower bearing surface of a second actuator arm.

12. The actuator assembly of claim 10 wherein:

the asperities on the upper and lower bearing surfaces of each actuator arm are formed as protrusions so that assembly of two actuator arms causes a plurality of protrusions formed on the lower bearing surface of a first actuator and to engage a plurality of protrusions formed on the upper bearing surface of a second actuator arm.

13. The actuator assembly of claim 10 wherein:

the asperities on the upper and lower bearing surfaces of each actuator arm are formed as depressions so that assembly of two actuator arms causes a plurality of depressions formed on the lower bearing surface of a first actuator arm to engage a plurality of depressions formed on the upper bearing surface of a second actuator arm.

14. The actuator assembly of claim 10 wherein:

the asperities on the upper and lower bearing surfaces of each actuator arm are formed as micro-pyramids so that assembly of two actuator arms causes a plurality of micro-pyramids formed on the lower bearing surface of a first actuator arm to engage a plurality of micro-pyramids formed on the upper bearing surface of a second actuator arm.

15. The actuator assembly of claim 10, wherein the asperities on the upper and lower bearing surfaces of each actuator arm are formed by a process selected from the group consisting of coining, mechanical grinding, machining, chemical etching, and laser etching.

16. The actuator assembly of claim 10 further comprising:

adhesive placed between the lower bearing surface of the first actuator arm and the upper bearing surface of the second actuator arm to further reduce relative motion of the two bearing surfaces when the actuator assembly is subjected to a mechanical shock.

17. The actuator assembly of claim 10 wherein:

each actuator arm defines a distal end mating surface that includes asperities intentionally formed on the mating surface; and the actuator assembly further comprises:

a head suspension assembly (HSA) having a distal end for supporting the read/write head and a proximal end mating surface that includes asperities intentionally formed on the mating surface; and means for assembling the HSA to the actuator arm so that the asperities on the proximal end mating surface of the HSA engage the asperities on the distal end mating surface of the actuator arm to increase frictional coupling between the mating surfaces and reduce relative motion of the two mating surfaces when the actuator assembly is subjected to a mechanical shock.

18. The actuator assembly of claim 17 wherein:

the means for assembling the HSA to the actuator arm includes a threaded fastener and a washer having a bearing surface for contacting one of the HSA and the actuator arm, the washer bearing surface including intentionally formed asperities to increase frictional coupling and reduce relative motion between the washer bearing surface and the one of the HSA and the actuator arm when the actuator assembly is subjected to a mechanical shock.

* * * * *

UNITED STATES PATENT AND TRADEMARK OFFICE
CERTIFICATE OF CORRECTION

PATENT NO. : 6,172,852 B1
DATED : January 9, 2001
INVENTOR(S) : Zine-Eddine Boutaghou, Gene Patrick Bonnie It is certified that error appears in the above-identified patent and that said Letters Patent is hereby corrected as shown below:

Column 7,
Line 29, after "employed" insert -- . --.

Column 9, claim 10,
Line 41, replace "and" with -- arm --.

Column 10, claim 12,
Line 2, replace "and" with -- arm --.

Signed and Sealed this

Fifth Day of March, 2002

Attest:

JAMES E. ROGAN
*Attesting Officer*   *Director of the United States Patent and Trademark Office*